US010783718B2

(12) United States Patent
Johansson et al.

(10) Patent No.: US 10,783,718 B2
(45) Date of Patent: Sep. 22, 2020

(54) COMPLEXITY REDUCTION OF OBJECTS VIA HOLE FILLING

(71) Applicant: Microsoft Technology Licensing, LLC, Redmond, WA (US)

(72) Inventors: Gustaf Johansson, Linköping (SE); Ulrik Lindahl, Linköping (SE)

(73) Assignee: Microsoft Technology Licensing, LLC, Redmond, WA (US)

(*) Notice: Subject to any disclaimer, the term of this patent is extended or adjusted under 35 U.S.C. 154(b) by 3 days.

(21) Appl. No.: 16/155,880

(22) Filed: Oct. 9, 2018

(65) Prior Publication Data

US 2020/0111265 A1 Apr. 9, 2020

(51) Int. Cl.
*G06T 19/20* (2011.01)
*G06T 15/30* (2011.01)

(52) U.S. Cl.
CPC ............. *G06T 19/20* (2013.01); *G06T 15/30* (2013.01); *G06T 2219/2016* (2013.01)

(58) Field of Classification Search
CPC .. G06T 19/20; G06T 15/30; G06T 2219/2016
See application file for complete search history.

(56) References Cited

U.S. PATENT DOCUMENTS

| 6,591,004 | B1* | 7/2003 | Vanessen ................ G06T 17/00 128/922 |
| 7,664,297 | B2 | 2/2010 | Harada et al. |
| 8,860,723 | B2 | 10/2014 | Johansson et al. |
| 2005/0249392 | A1 | 11/2005 | Allain et al. |
| 2009/0171627 | A1* | 7/2009 | Olson ...................... G06T 17/00 703/1 |
| 2017/0221254 | A1 | 8/2017 | Zar et al. |
| 2017/0358127 | A1 | 12/2017 | Lindahl et al. |
| 2019/0134915 | A1* | 5/2019 | Schmidt .................. G06F 17/50 |
| 2020/0111266 | A1 | 4/2020 | Johansson et al. |

OTHER PUBLICATIONS

"Non Final office Action Issued in U.S. Appl. No. 16/561,930", dated Dec. 2, 2019, 12 Pages.
Javeed, "A Novel Region Filling Algorithm for Discontinuous Contours", in International Journal of Research in Engineering and Technology, Dec. 15, 2017, pp. 18-23.
Lohmann, "A New Method of Extracting Closed Contours Using Maximal Ddiscs", in Proceedings of International Conference on Computer Analysis of Images and Patterns, Sep. 6, 1995, 8 Pages.

(Continued)

*Primary Examiner* — Chong Wu

(57) ABSTRACT

Systems and methods are disclosed for removing details from three dimensional (3D) objects, such as cavities and holes. Complexity reduction via hole filling reduces storage, transfer, and rendering costs without adversely impacting quality and is implemented in an automated manner. In some examples, a 3D object is dilated and eroded, and undesirable webbing is removed to preserve a higher percentage of exterior detail. Holes and cavities, which are obscured in many viewing angles, are filled in (e.g., removed), thereby reducing the burden of storing and processing hidden interior surfaces. Various approaches, leveraging distance fields, may be combined for improved benefit.

20 Claims, 13 Drawing Sheets

(56) References Cited

OTHER PUBLICATIONS

"International Search Report and Written Opinion Issued in PCT Application No. PCT/US2019/046083", dated Oct. 30, 2019, 12 Pages.
Tran, "3D Contour Closing: A local Operator Based on Chamfer Distance Transformation", Retrieved from: https://hal.archives-ouvertes.fr/hal-00802068/file/cclose_tran.pdf, Mar. 18, 2013, 16 Pages.
Altintas, et al., "Effect of 3D Isotropic Resolutions of Sequenced Images on Natural Vibration Properties of Trabecular Bone", in Journal of Scientia Iranica, vol. 20, Issue 3, Jun. 2013, pp. 492-499.
Dachille, et al., "Incremental Triangle Voxelization", in Proceedings of the Graphics Interface Conference, May 15, 2000, 8 Pages.
Januszewski, et al., "Flood-Filling Networks", in Journal of Computing Research Repository, Nov. 2016, pp. 1-11.
"Mild or Wild: Robustness through Morphological Filtering: MyCarta", Retrieved from https://mycarta.wordpress.com/2016/12/10/mild-or-wild-robustness-through-morphological-filtering/, Dec. 10, 2016, 4 Pages.
Jones, et al., "Using Distance Fields for Object Representation and Rendering", Retrieved from http://cs.swansea.ac.uk/~csmark/PDFS/eguk2001a.pdf, Mar. 12, 2001, 8 Pages.
"International Search Report and Written Opinion Issued in PCT Application No. PCT/US2019/052540", dated Nov. 21, 2019, 12 Pages.

\* cited by examiner

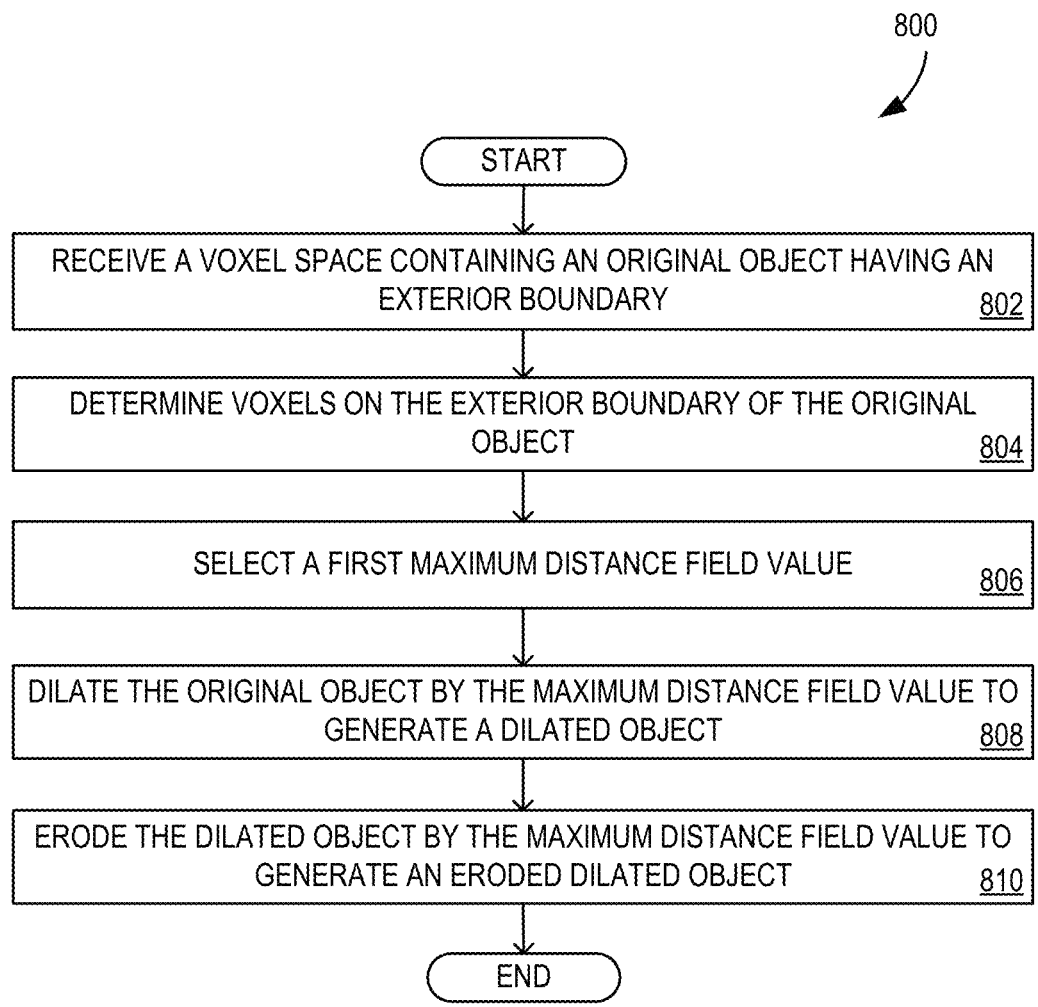

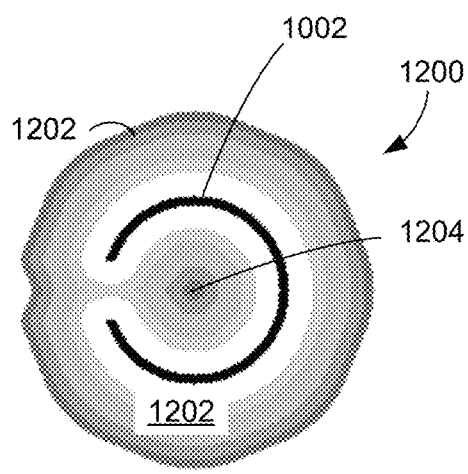
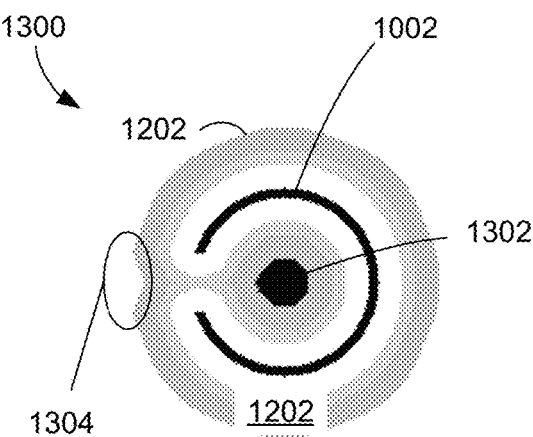
FIG. 12
FIG. 13
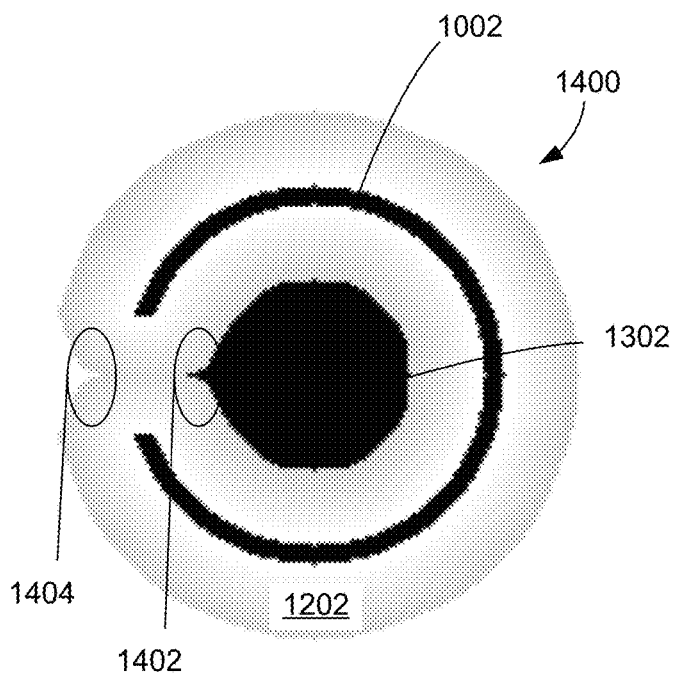
FIG. 14
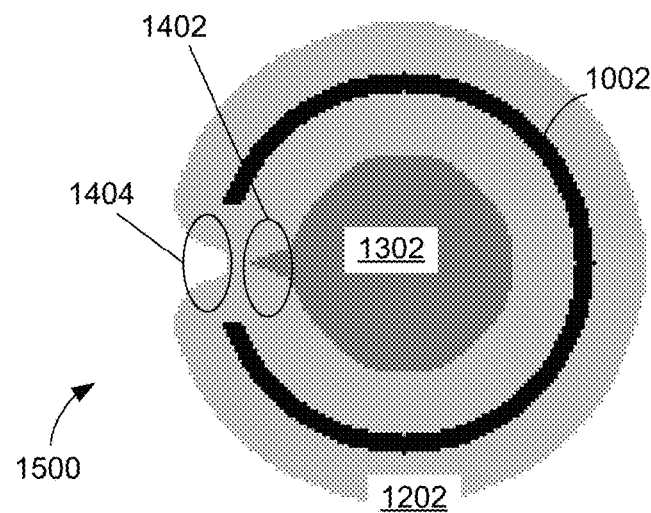
FIG. 15

COMPLEXITY REDUCTION OF OBJECTS VIA HOLE FILLING

BACKGROUND

Some three-dimensional (3D) virtual objects (e.g., assets) intended for mixed reality (MR), virtual reality (VR), and augmented reality (AR) (collectively MR) displays may have more complexity than is necessary for a satisfactory user experience. For example, a large polygon count (e.g., polycount) in hidden portions of an asset, such as the interior, do not add much for a satisfactory user experience in some systems, but yet can notably increase rendering and download time. This can unnecessarily slow frame rate and transfer speeds, resulting in a degraded user experience. Some assets may be generated for certain high-end platforms, but then used in systems having tighter storage and processing constraints. For example, some MR display platforms may impose constraints for storage and processing, further inhibiting satisfactory rendering as perceived by the user. Manual editing of individual assets to find a better balance point for asset complexity versus performance is time consuming and often sub-optimal.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects and examples disclosed herein are directed to complexity reduction via hole filling by: receiving a voxel space containing a first object having an exterior boundary; determining voxels on the exterior boundary of the first object; selecting a first maximum distance field value; dilating the first object by the maximum distance field value to generate a dilated object; and eroding the dilated object by the maximum distance field value to generate an eroded dilated object.

BRIEF DESCRIPTION OF THE DRAWINGS

The disclosed examples are described in detail below with reference to the accompanying drawing figures listed below:

FIG. 8 is a flow chart illustrating exemplary operations involved in complexity reduction via hole filling;

FIGS. 12-17 illustrate intermediate stages of complexity reduction via cavity removal;

Corresponding reference characters indicate corresponding parts throughout the drawings.

DETAILED DESCRIPTION

Figure 1:
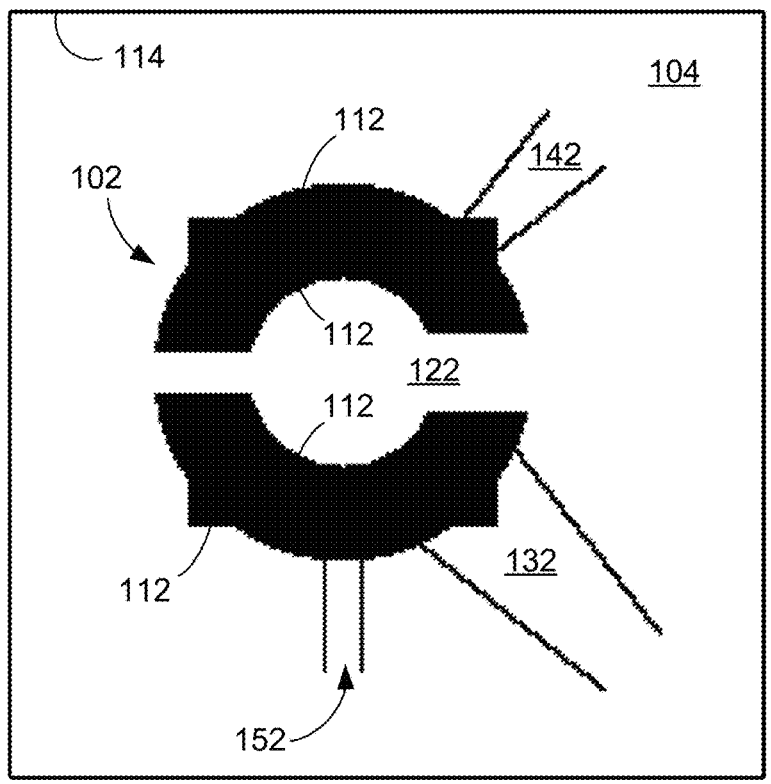
FIG. 1 illustrates a two dimensional (2D) cut plane of a three dimensional (3D) object.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Some three-dimensional (3D) virtual objects (e.g., assets) intended for mixed reality (MR), virtual reality (VR), and augmented reality (AR) (collectively MR) displays have more complexity than is necessary for a satisfactory user experience. Some examples of 3D objects include a set of voxels indicated as being within the volume of the object, which can be rendered in an MR display. Some 3D objects include a set of meshes and a definition of a surface texture, such as a texel map or perhaps a material specification. Additionally, some MR display platforms, such as head mounted displays (HMDs) may impose constraints for storage and processing, making it difficult for render complex 3D objects.

Aspects of the disclosure reduce complexity of 3D objects by filling holes and/or removing cavities in an automated or semi-automated fashion (e.g., not manually). Exemplary candidates for complexity reduction include 3D scan data that is "noisy" or "busy", such as those including gaps, holes, and cavities. The disclosure operates to reduce the polycount of the 3D objects to optimize a balance between visual complexity of the 3D objects and rendering performance of those 3D objects. Polycount is reduced in a manner that does not adversely affect display quality as perceived by the user. Filling holes and/or removing cavities improves the frame rate and transfer speeds (e.g., reduces bandwidth usage) and reduces storage burdens, thereby improving the functionality of at least one computing device.

Systems and methods are disclosed for removing unnecessary details, such as cavities and holes, from 3D objects. In some examples, a 3D object is dilated and eroded, and undesirable webbing is removed to preserve a higher percentage of exterior detail. In some examples, distance fields internal and external to the object are removed in a layered manner, and new object surfaces are added wherever openings are narrower than the cavity's internal dimensions, to seal off the cavities. Holes and cavities, which are obscured in many viewing angles, are thus filled in (e.g., removed), thereby reducing the burden of storing and processing the hidden interior surfaces to improve rendering performance.

Different disclosed approaches leveraging distance fields may be combined. For example, aspects of the disclosure operate to fill one or more holes in 3D objects without removing cavities. In other examples, aspects of the disclosure operate to remove one or more cavities in 3D objects without filling holes. In still other examples, aspects of the disclosure operate to fill one or more holes in 3D objects while removing one or more cavities in those same 3D objects. As such, aspects of the disclosure operate to fill one or more holes and/or remove one or more cavities in 3D objects to reduce complexity of those 3D objects.

Although the examples use voxels (e.g., 3D pixels), it should be understood that the techniques disclosed herein may also be applied to two-dimensional (2D) pixels.

FIG. 1 illustrates a 2D cut plane 100 of an exemplary 3D object 102 in a 3D voxel space 104. Voxel space 104 has an outer edge 114. In this example, object 102 is the original received object (e.g., a first object) and has an exterior boundary 112 which includes the interior walls of a cavity 122. Object 102 also has additional cavity 132 and holes 142 and 152. Cavities 122 and 132 have openings that are narrower than the internal dimensions, whereas hole 142 has an opening that is wider than the dimensions further inside, and hole 152 has a constant width.

Figure 2:
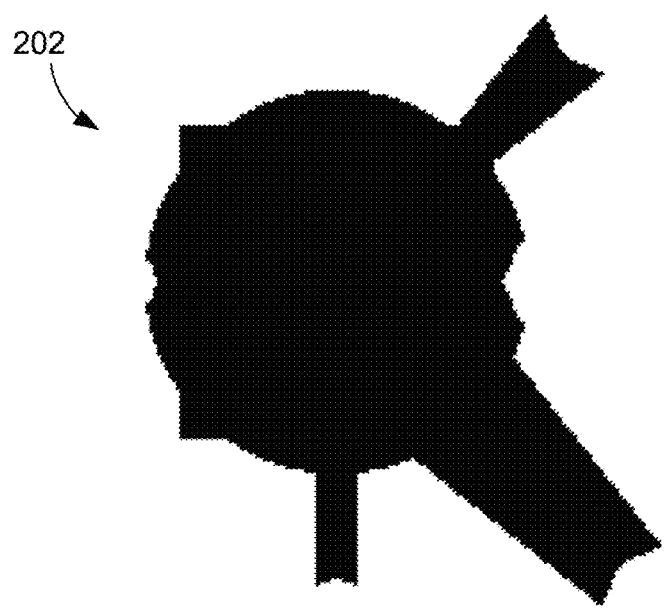
FIG. 2 illustrates a 2D cut plane of a reduced-complexity 3D object, generated in accordance with various aspects of the disclosure.

FIG. 2 illustrates an exemplary 2D cut plane of a reduced-complexity object 202 (e.g., 3D object) that was generated from original object 102 in accordance with a complexity reduction via hole filling operation. In some examples, the hole filling operation is represented by the operations described by flow charts 800 and 900 in FIGS. 8 and 9, respectively, with FIGS. 3-7 illustrating intermediate stages.

Figure 3:
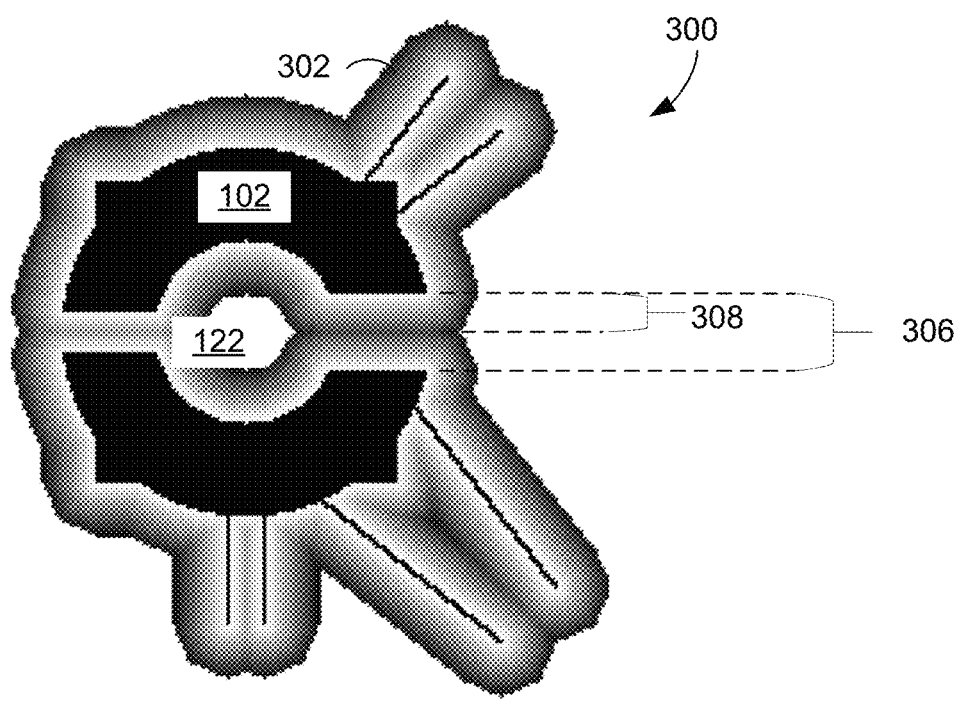
FIGS. 3-6 illustrate intermediate stages of complexity reduction via hole filling.

FIG. 3 illustrates an intermediate stage 300 of complexity reduction via hole filling. After voxel space 104 containing original object 102 having an exterior boundary 112 has been received or accessed, and the voxels on exterior boundary 112 of original object 102 have been determined, a first maximum distance field value is selected. The first maximum distance field value may be specified by a human operator, may be determined based on the size and some complexity metric of original object 102, or may be a trial value in an optimization loop. A first distance field 302 is generated outward from exterior boundary 112 of original object 102, up through the maximum distance field value. In some examples, generating first distance field 302 may involve rastering through at least a portion of voxel space 104. For each voxel exterior to original object 102, a distance to a nearest exterior boundary voxel (e.g., a voxel on exterior boundary 112 of original object 102) is determined. Based at least on the determined distance being less than or equal to the maximum distance field value, the determined distance is assigned to the voxel as a first distance field value. Distance field values may be quantized, to permit easier calculations of equality for distance field values of different voxels.

A floodfill boundary 402 (see FIG. 4) is the set of outermost voxels of the first distance field having a distance value equal to the maximum distance field value. Floodfill boundary 402 is determined using only the outer-most voxels of first distance field 302, even if multiple voxels may have the same distance field value, in some embodiments. For example, cavity 122 has an opening width 306, which is fully closed off by distance field 302 only if distance field 302 has a depth 308 equal to at least half of opening width 306. This permit filling in of cavity 122. In another example, a maximum distance field value that is less than half of opening width 306 would not result in the closure of the opening of cavity 122 and thus would fail to fill in cavity 122. If, initially, a maximum distance field value had been selected that was too small to close off cavity 122, then by iterating with increasing maximum distance field values (e.g., additional maximum distance field values that are higher), then eventually, a maximum distance field value will be used that will close off cavity 122. If, however, an initial maximum distance field value had been selected that was far in excess of what was necessary to close off cavity 122, then by iterating with decreasing maximum distance field values (e.g., additional maximum distance field values that are smaller), then eventually, a maximum distance field value will be used that will not close off cavity 122. Abrupt changes in the number of voxels included within the final resulting object may be detectable.

Figure 4:
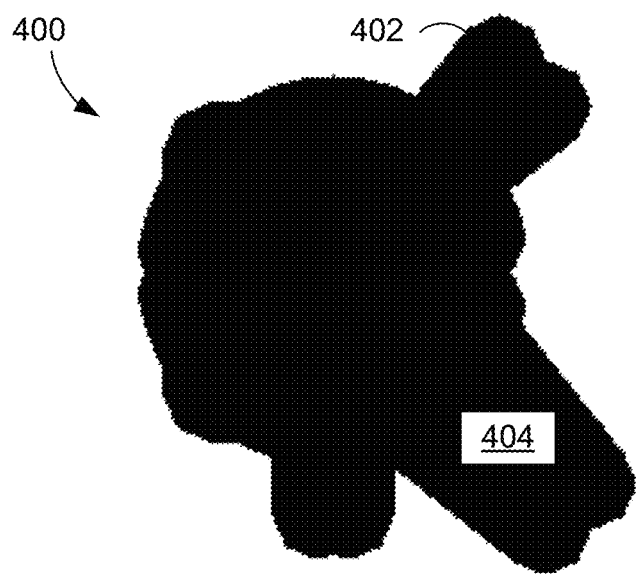

With the maximum distance field value set to exactly half of opening width 306 (within quantization tolerances), there is a line of voxels having the same distance field value, stretching from inside cavity 122 to outside of original object 102. Only the outermost of these voxels are used for floodfill boundary 402 in this example. The voxels interior to floodfill boundary 402 are a floodfill region 404 that is floodfilled to generate intermediate stage 400, as illustrated in FIG. 4. In stage 400, all holes and cavities of original object 102 have been filled, although surface detail (e.g., details of exterior boundary 112) have been lost. Stage 400 is thus a dilated object, generated by dilating original object 102 by the maximum distance field value.

Figure 5:
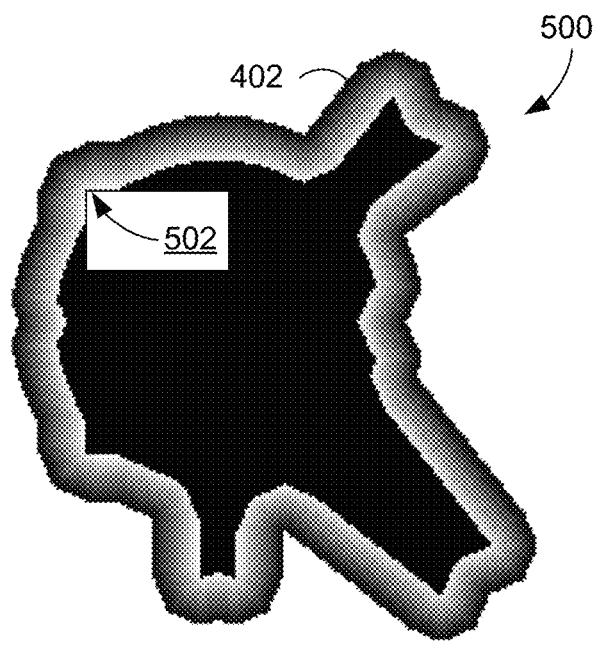

The next stages are used to recover at least some of the original surface detail. Part of the operation includes eroding the dilated object of stage 400 by the maximum distance field value to generate an eroded dilated object 600 (see FIG. 6). Referring to FIG. 5, showing stage 500, a second distance field 502 is generated inwardly from floodfill boundary 402, up through the maximum distance field value—the same maximum distance field that was used for the dilation procedure. In some examples, generating second distance field 502 may involve rastering through at least a portion of voxel space 104. For each voxel interior to floodfill region 404, a distance to a nearest floodfill boundary voxel (e.g., a voxel on floodfill boundary 402) is determined. Based at least on the distance being less than or equal to the maximum distance field value, the determined distance is assigned to the voxel as a second distance field value.

Figure 6:
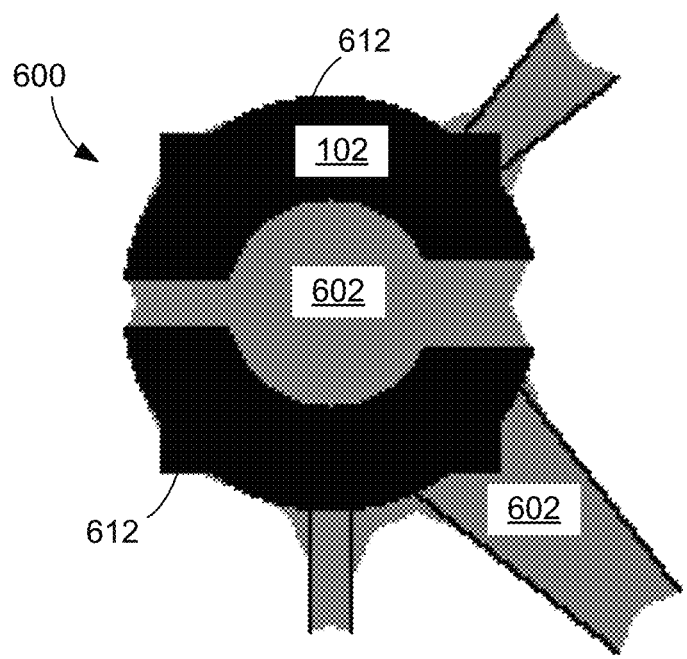

The voxels in the second distance field are removed (e.g., eroded) from floodfill region 404 to generate eroded dilated object 600 as illustrated in FIG. 6. In FIG. 6, original object 102 is overlayed on the eroded results of stage 500. An exterior boundary 612 shows at least some of the details of exterior boundary 112 of original object 102. Voxels that have been added by the dilation, floodfill, and erosion processes (together called "closure" in some examples) are indicated as added voxel regions 602. Added voxels may be determined by identifying voxels in eroded dilated object 600 that are not also in original object 102.

Figure 7A:
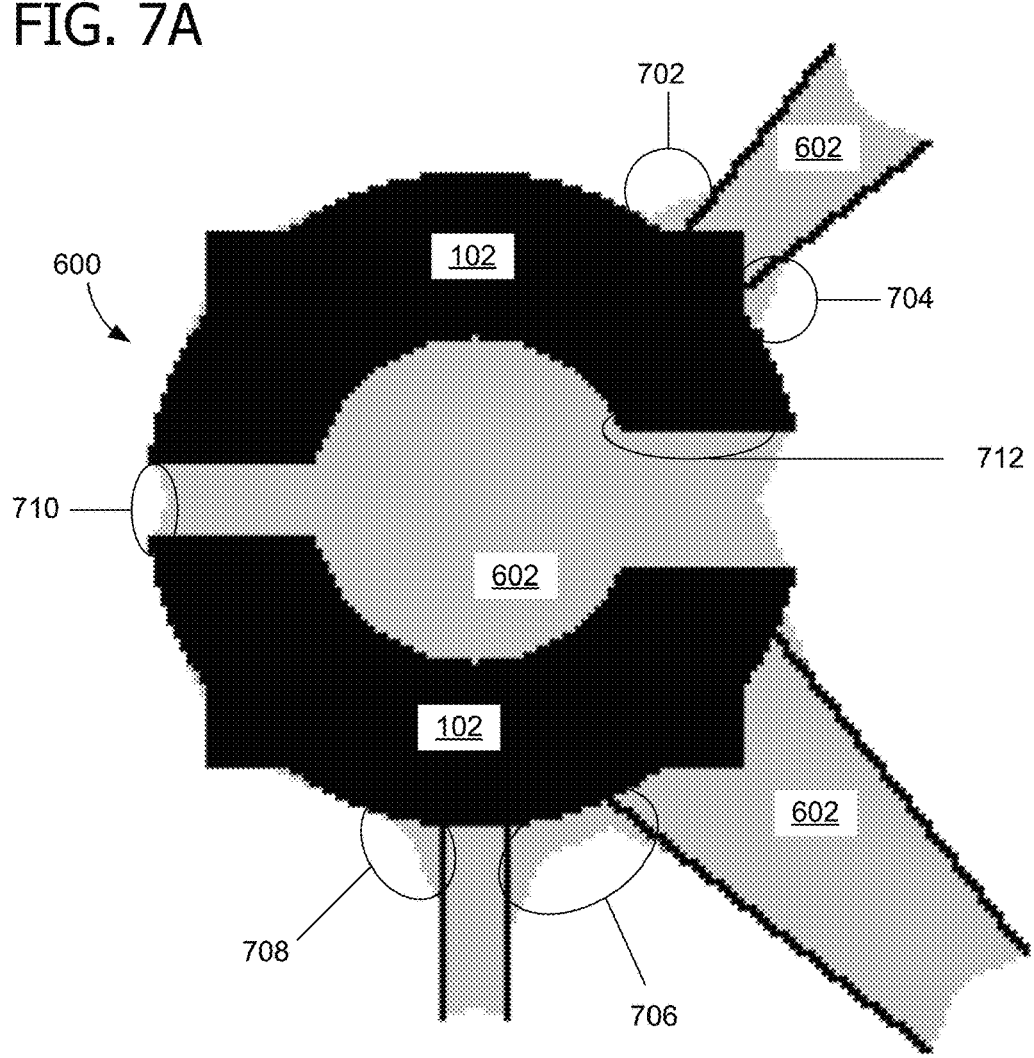
FIG. 7A illustrates a magnified view of the intermediate stage of FIG. 6.

Eroded dilated object 600 contains webbing, which may be undesirable in some examples, as it blurs exterior boundary details (see the magnified view of FIG. 7A). Four regions of webbing 702, 704, 706, and 708 are indicated in this example. In some examples, a procedure is implemented to remove regions of webbing 702, 704, 706, and 708, without clearing out cavities and holes that have been filled in. The result is the reduced-complexity object 202 of FIG. 2. The procedure is described in more detail for FIG. 9, and involves determining, for each of one or more added regions, a ratio of the number of internal surface voxels to the number of external. In some examples, the number of internal surface voxels is divided by the number of external surface voxels to obtain the ratio. Higher ratios are associated with filling deep holes and cavities, whereas lower ratios are associated with filling of shallow surface depressions and webbing (such as regions of webbing 702, 704, 706, and 708). Webbing having a ratio of internal surface voxels to external surface voxels that is below a first ratio threshold are removed from eroded dilated object 600. In some examples, the threshold ratio may be approximately 1.5 to 2.

Figure 7B:
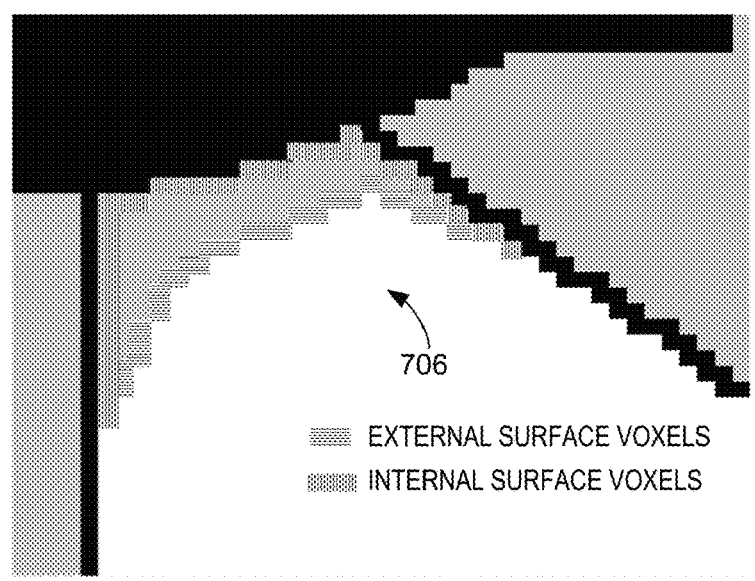
FIG. 7B illustrates a further magnified view of a portion of FIG. 7A.

Of the added voxels, a surface voxel is one that is adjacent to a voxel that is not an added voxel. Of the added surface voxels, an added surface voxel that is adjacent to an empty voxel (a voxel that is not in original object 102) is flagged, or otherwise labeled, as an external surface voxel. A set of external surface voxels 710 is indicated in FIG. 7A. Of the added surface voxels, an added surface voxel that is adjacent to original object 102 is flagged as an internal surface voxel. A set of internal surface voxels 712 is also indicated in FIG. 7B. Internal surface voxels are surface voxels that are not external surface voxels. That is, they are surface voxels and they are not adjacent to a voxel that is not in original object 102.

FIG. 7B illustrates a further magnified view of a portion of FIG. 7A. Specifically, FIG. 7B illustrates region of webbing 706 in greater detail, with the external surface voxels annotated with horizontal lines and the internal surface voxels annotated with vertical lines.

With the webbing removed, a reduced complexity object has been generated that may be easier to render, store, and transfer, and yet may preserve at least some of the surface detail of the original object.

FIG. 8 is a flow chart 800 illustrating exemplary operations involved in complexity reduction via hole filling. The operations illustrated in FIG. 8 may be performed by any processing unit, such as a computing node. Operation 802 includes receiving a voxel space containing an original object having an exterior boundary. Operation 804 includes determining voxels on the exterior boundary of the original object. Operation 806 includes selecting a first maximum distance field value. Operation 808 includes dilating the original object by the maximum distance field value to generate a dilated object. Operation 810 includes eroding the dilated object by the maximum distance field value to generate an eroded dilated object.

Figure 9:
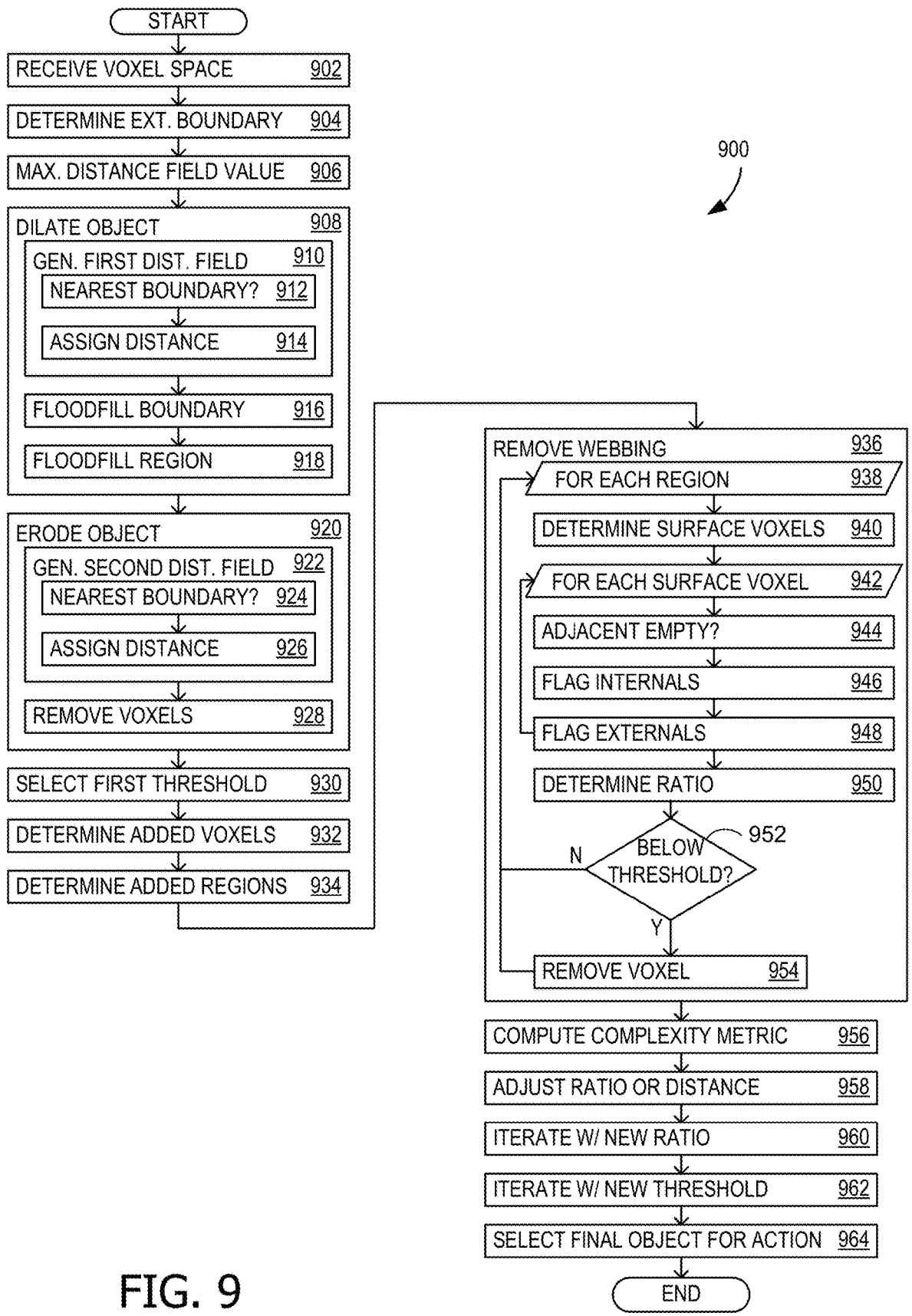
FIG. 9 is another flow chart illustrating exemplary operations involved in complexity reduction via hole filling.

FIG. 9 is a flow chart 900 illustrating exemplary operations involved in complexity reduction via hole filling. The operations illustrated in FIG. 9 may be performed by any processing unit, such as a computing node. Operation 902 includes receiving a voxel space containing an original object having an exterior boundary, and operation 904 includes determining voxels on the exterior boundary of the original object. Operation 906 includes selecting a first maximum distance field value, which may be input by a user, selected based on historical values, or selected by an automated operation that iterates with multiple different values, in order to find an optimum value.

Operation 908 involves dilating the original object by the maximum distance field value to generate a dilated object, and is comprised of operations 910-918. Operation 910 generates a first distance field, outward from the exterior boundary of the original object, up through the maximum distance field value. Operation 910 comprises operations 912 and 914. In some examples, operation 912 rasters through at least a portion of the voxel space and, for each voxel exterior to the original object, determines a distance to a nearest exterior boundary voxel of the original object. In operation 914, based at least on the determined distance being less than or equal to the maximum distance field value, the determined distance is assigned to the voxel as a first distance field value. Distance field values may be quantized, to permit easier calculations of equality for distance field values of different voxels.

In operation 916, a floodfill boundary is determined. The floodfill boundary is a set of outermost voxels of the first distance field having a distance value equal to the maximum distance field value. Operation 918 floodfills a floodfill region comprising voxels interior to the floodfill boundary. The resulting dilated object includes the voxels in the floodfill region. Operation 920 erodes the dilated object by the maximum distance field value to generate an eroded dilated object, and comprises operations 922-928. Operation 922 generates a second distance field, inward from the floodfill boundary, up through the maximum distance field value. Operation 922 may include rastering through at least a portion of the voxel space, and for each voxel interior to the floodfill region, determining a distance to a nearest floodfill boundary voxel in operation 924. Operation 926 includes, based at least on the distance being less than or equal to the maximum distance field value, assigning the determined distance to the voxel as a second distance field value. Operation 928 then removes, from the floodfill region, voxels in the second distance field, wherein the eroded dilated object comprises voxels remaining in the floodfill region. This generates an eroded dilated object. The process of dilating and eroding (e.g., operation 908 and 920) may be referred to as closure.

A first ratio threshold is selected in operation 930. The first ratio threshold may be input by a user, selected based on historical values, or selected by an automated operation that iterates with multiple different values, to find an optimum value. In some examples, a threshold ratio is approximately 1.5 to 2. A higher threshold retains more of the original surface resulting in higher rendering quality, but at a cost of lower compression potential. This is an example of a quality versus performance trade-off. Different threshold ratios may be used, based on factors of connection speed, storage capacity, and frame rate performance. Operation 932 includes determining one or more added voxels as voxels in the eroded dilated object and not in the original object, such as by rastering through at least a portion of the voxel space. Operation 934 includes determining one or more added regions as sets of contiguous regions of added voxels.

Operation 936 removes webbing from the eroded dilated object, and comprises operations 938-954. Operation 936 removes webbing having a ratio of internal surface voxels to external surface voxels below the first ratio threshold. Operation 938 sets up an iteration process for each added region. Operation 940 determines surface voxels of the added region, and operation 942 sets up an iteration process for each surface voxel of the added region. Operation 944 determines whether the surface voxel of the added region is adjacent to a voxel not in the original object (e.g., an empty voxel). Operations 946 and 948 flag the surface voxels as either external surface voxels or internal surface voxels. Operation 946 includes, based at least on the surface voxel of the added region being adjacent to a voxel not in the original object, flagging the voxel as an external surface voxel. Operation 948 includes, based at least on the surface voxel of the added region not being adjacent to a voxel not in the original object, flagging the voxel as an internal surface voxel. External surface voxels are those voxels that had been added and which are adjacent to empty voxels, and internal surface voxels are those voxels that had been added and which are not adjacent to empty voxels, but instead are adjacent to the original object. Added voxels that are adjacent to both empty voxels and the original object are external surface voxels.

Operation 950 determines, for the added region, a ratio of a number of internal surface voxels to a number of external surface voxels. The number of internal surface voxels is divided by the number of external surface voxels to obtain the ratio. Decision operation 952 determines whether the ratio is below the threshold. If it is, then operation 954 includes, based at least on the ratio for the added region being below the first ratio threshold, removing the added region from the eroded dilated object.

In some examples, a complexity metric may be computed to ascertain the complexity of the object in operation 956. This complexity metric is used in operation 958 to adjust the maximum distance field value or the ratio threshold, as part of an optimization process in some examples. In some examples, a count of the outside voxels of the final object is used to determine whether to increase or decrease the distance field maximum distance field value or the ratio threshold. That is, operation 958 includes, based at least on computing a complexity metric, adjusting at least one of the ratio threshold and the maximum distance field value. Operation 960 iterates, with at least one additional (e.g., new) ratio threshold, removing of webbing to generate a plurality of eroded dilated objects. Operation 962 iterates, with at least one additional (e.g., new) maximum distance field value, dilating the original object and eroding the dilated object to generate a plurality of eroded dilated objects. In some examples, operation 964 includes selecting, from the plurality of eroded dilated objects, a reduced-complexity object as the final object for some action. In some examples of operation 964, that action may include displaying the final object, for example on presentation components 2216 (of FIG. 22) that may include an HMD. In some examples of operation 964, that action may include rendering the final object for display, for example using computing device 2200 and presentation components 2216 (See FIG. 22), which may include an HMD. In some examples of operation 964, that action may include storing the final object for a later rendering operation in memory 2212 of computing device 2200. In some examples of operation 964, that action may include transmitting the final object to a remote node (e.g., a remote version of computing device 2200), using network component 2224 of computing device 2200.

Cavity removal from 3D objects is next discussed.

Figure 10:
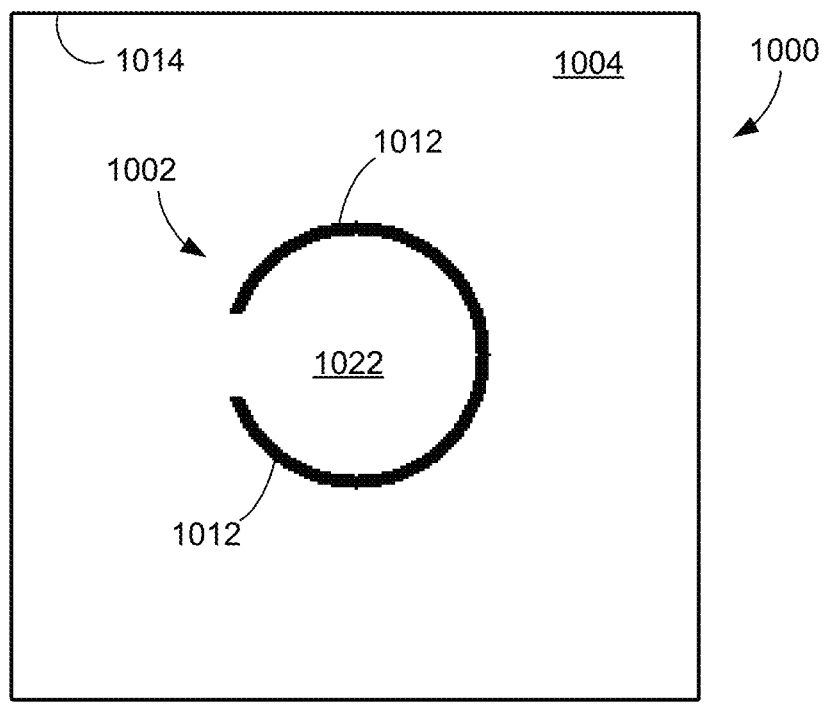
FIG. 10 illustrates a 2D cut plane of another 3D object.
Figure 11:
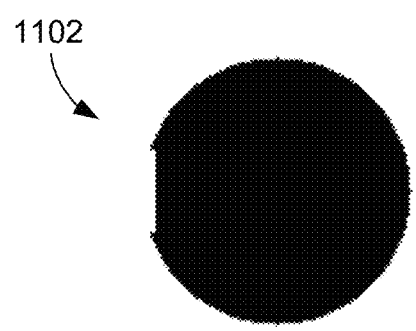
FIG. 11 illustrates a 2D cut plane of another reduced-complexity 3D object, generated in accordance with various aspects of the disclosure.

FIG. 10 illustrates a 2D cut plane 1000 of an exemplary 3D object 1002 in a 3D voxel space 1004. Voxel space 1004 has an outer edge 1014. In this example, object 1002 is the original received or accessed object and has an initial exterior boundary 1012 and a cavity 1022. FIG. 11 illustrates an exemplary 2D cut plane of a reduced-complexity object 1102 (3D object) that was generated from original object 1002 in accordance with a complexity reduction via cavity removal operation. For example, cavity 1022 has been removed. In some examples, the operations are described by flow charts 1800 and 1900 in FIGS. 18 and 19, respectively, with FIGS. 12-17 illustrating intermediate stages.

FIG. 11 illustrates a stage 1200 in which a distance field 122 has been generated outwardly from initial exterior boundary 1012 of original object 1002. Initially, distance field 1202 may have been generated for all voxels in voxel space 1004 and not in original object 1002. In some examples, generating a distance field involves, for each voxel exterior to original object 1002, determining a distance to a nearest initial exterior boundary voxel (a voxel on exterior boundary 1012 of original object 1002) and assigning the determined distance to the voxel as a distance field value. Distance field values may be quantized, to permit easier calculations of equality for distance field values of different voxels. Voxels having a local maximum distance field value may be found, and the largest local maximum value determined from among the local maxima. The determination of local maxima excludes voxels on outer edge 1014. Voxels having a distance field value greater than the largest local maximum value are removed from the distance field. The resulting distance field now extends only as far outward from original object 1002 as the maximum depth of cavity 1022. This is stage 1200 illustrated in FIG. 12, with a single local maximum at point 1204 in the center (e.g., the maximum distance from all points of original object 1002).

An iterative loop draws down distance field 1202, one layer at a time. A layer in distance field 1202 is all voxels having the same distance field value. Starting with the largest local maximum value, all voxels having the same distance field value as the current distance field value are removed. Voxels that are removed from distance field 1202 are flagged as being in an interior region, flagged as being in an exterior region, or both. An interior region voxel is a voxel removed from the distance field that is contiguous (e.g., through one or more other voxels removed from the distance field) with a voxel having a local maximum. For example, an interior region voxel is a voxel that is immediately adjacent to a voxel having a local maximum, or contiguous to the voxel having a local maximum via one or more other voxels removed from the distance field.

In the illustrated example of FIG. 13, at stage 1300, an interior region 1302 is a set of voxels that had been removed from distance field 1202 and are contiguous with the local maximum at point 1204 (see FIG. 12). Removed voxels that are not interior region voxels are flagged as exterior region voxels. The exterior region encircles the outside of distance field 1202. A set of exterior region voxels 1304 is indicated, which contains local maximum at point 1204 and other voxels contiguous with it, that are not within distance field 1202. Another process of determining exterior region voxels determines that voxels removed from distance field 1202 that are contiguous, through one or more other voxels removed from distance field 1202, with a voxel on outer edge 1014 of voxel space 1004 are exterior region voxels. Thus, exterior region voxels may be determined directly, or by determining that they are not interior region voxels.

FIGS. 14 and 15 illustrate an exemplary progression of the iterative process as distance field 1202 is reduced. A spike 1402 appears in interior region 1302 and another spike 1404 appears in the exterior region outside distance field 1202. Interior region 1302 grows as distance field 1202 shrinks. If there are multiple local maxima, the interior region surrounding the largest local maximum grows first, and the interior regions surrounding the other local maxima start growing when the distance field has shrunk to include only lower values comparable to the other local maxima.

Figure 16:
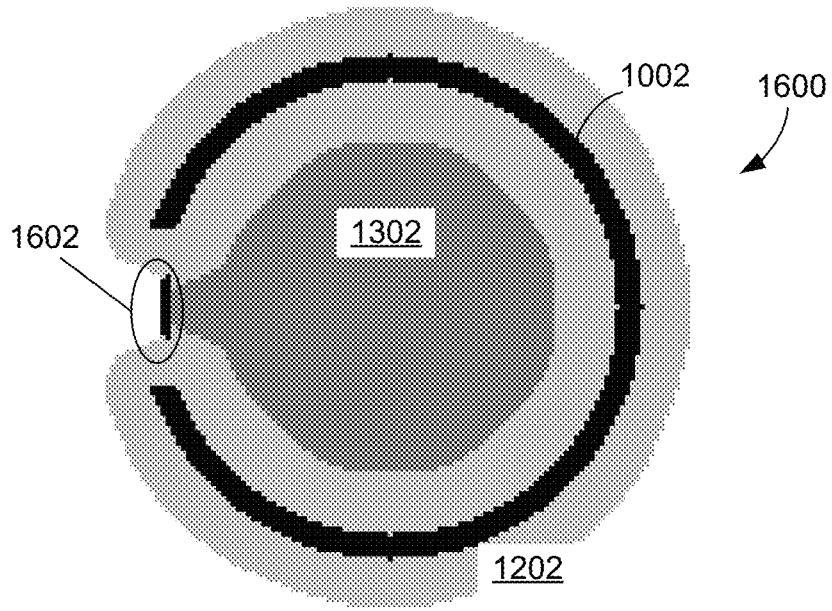
Figure 17:
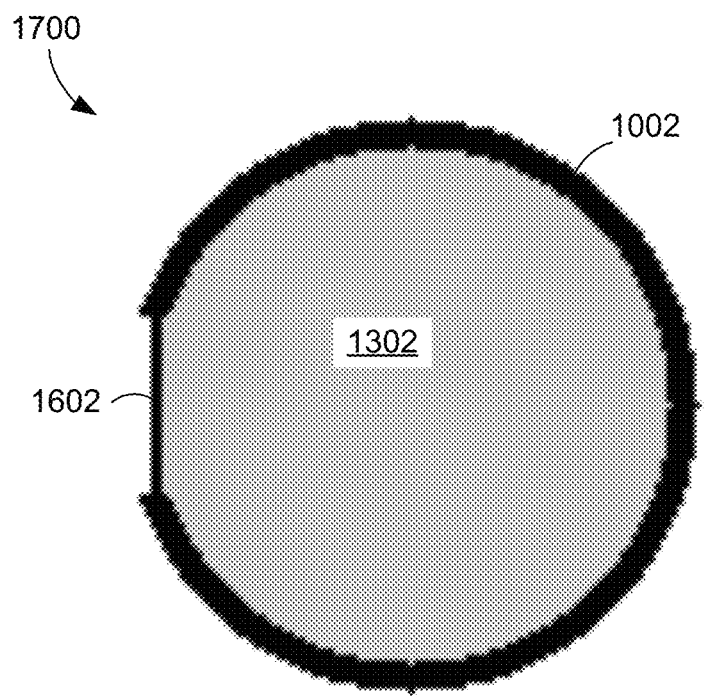

The spikes 1402 and 1404 start off small in stage 1400 of FIG. 14, and grow by stage 1500 of FIG. 15. When spikes 1402 and 1404 touch, the voxels at the center of the intersection are flagged as both in an interior region and in an exterior region. When this occurs, based at least on a voxel being flagged as both in an interior region and in an exterior region, those voxel are flagged as added boundary voxels. In some situations, removing a layer of distance field 1202 removes multiple voxels in a line between spikes 1402 and 1404. Rather than adding the entire set of newly-removes voxels added boundary voxels, only the center voxel is added as a boundary voxel. This is illustrated in FIG. 16, showing stage 1600. A new added boundary 1602 is generated at the intersection area, in the center. By the time distance field 1202 is fully depleted in stage 1700 (see FIG. 17), added boundary 1602 closes up original object 1002. Interior region 1302 fully occupies the interior of an adjusted exterior boundary, defined by combination of initial exterior boundary 1012 of original object 1002 and added boundary 1602. Any "leaks" of original object 1002 are sealed because the voxels in any openings are flagged as both in an interior region and in an exterior region and therefore be flagged as added boundary voxels. Floodfilling voxels up through the adjusted exterior boundary generates reduced-complexity object 1102 of FIG. 11.

Figure 18:
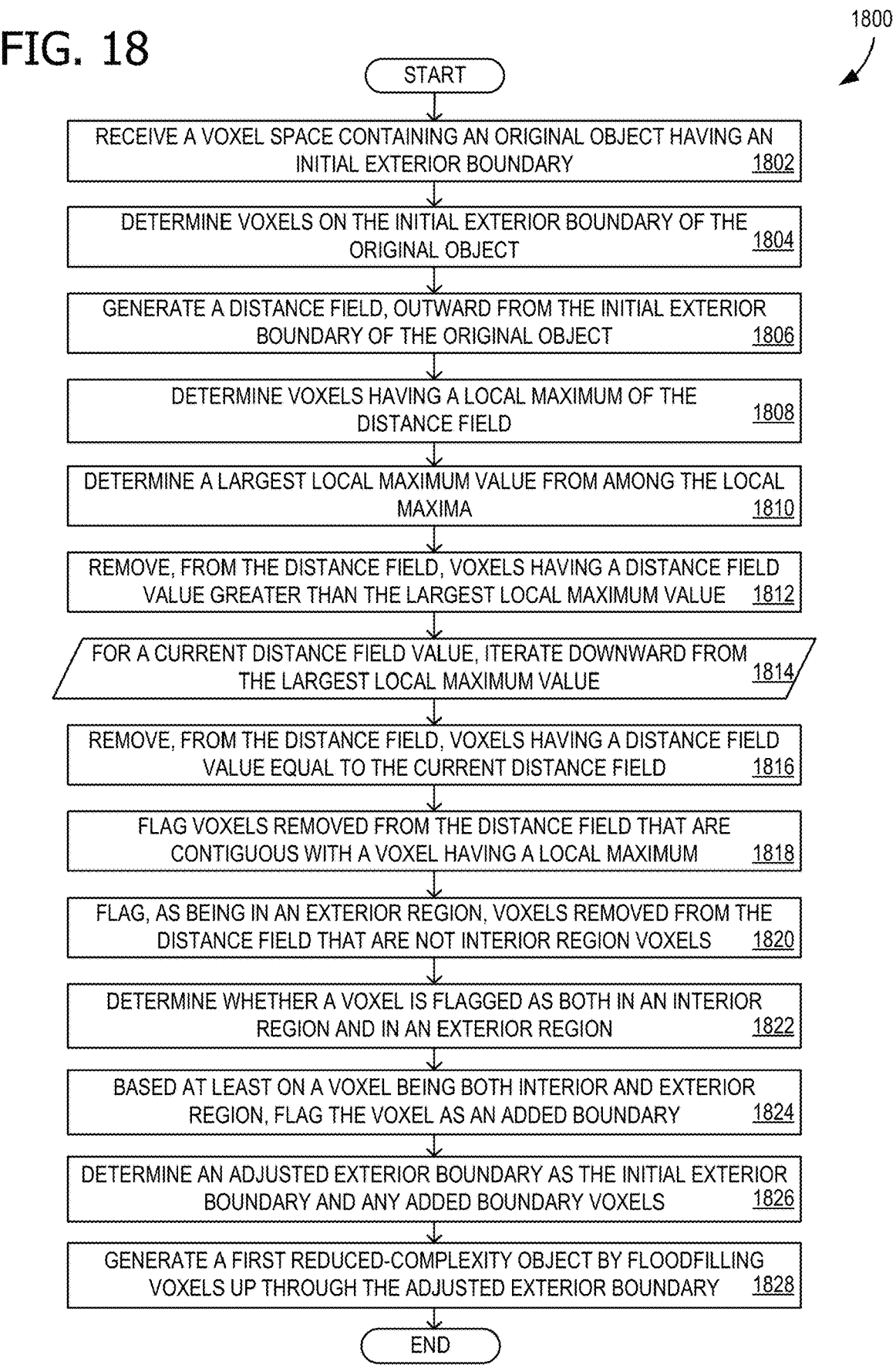
FIG. 18 is a flow chart illustrating exemplary operations involved in complexity reduction via cavity removal.

FIG. 18 is a flow chart 1800 illustrating exemplary operations involved in complexity reduction via cavity removal. The operations illustrated in FIG. 18 may be performed by any processing unit, such as a computing node. Operation 1802 includes receiving a voxel space containing an original object having an initial exterior boundary. Operation 1804 includes determining voxels on the initial exterior boundary of the original object. Operation 1806 includes generating a distance field, outward from the initial exterior boundary of the original object. Operation 1808 includes determining voxels having a local maximum of the distance field. Operation 1810 includes determining a largest local maximum value from among the local maxima. Operation 1812 includes removing, from the distance field, voxels having a distance field value greater than the largest local maximum value.

Operation 1814 includes setting up an iteration for a current distance field value iterating downward from the largest local maximum value (e.g., reducing the value with each iteration). Operation 1816 includes removing, from the distance field, voxels having a distance field value equal to the current distance field. Operation 1818 includes flagging, as being in an interior region, voxels removed from the distance field that are contiguous, through one or more other voxels removed from the distance field, with a voxel having a local maximum. Operation 1820 includes flagging, as being in an exterior region, voxels removed from the distance field that are not interior region voxels. Operation 1822 includes determining whether a voxel is flagged as both in an interior region and in an exterior region. Operation 1824 includes, based at least on a voxel being flagged as both in an interior region and in an exterior region, flagging the voxel as an added boundary voxel. Operation 1826 includes determining an adjusted exterior boundary as the initial exterior boundary of the object and any added boundary voxels. Operation 1828 includes generating a first reduced-complexity object by floodfilling voxels up through the adjusted exterior boundary.

Figure 19:
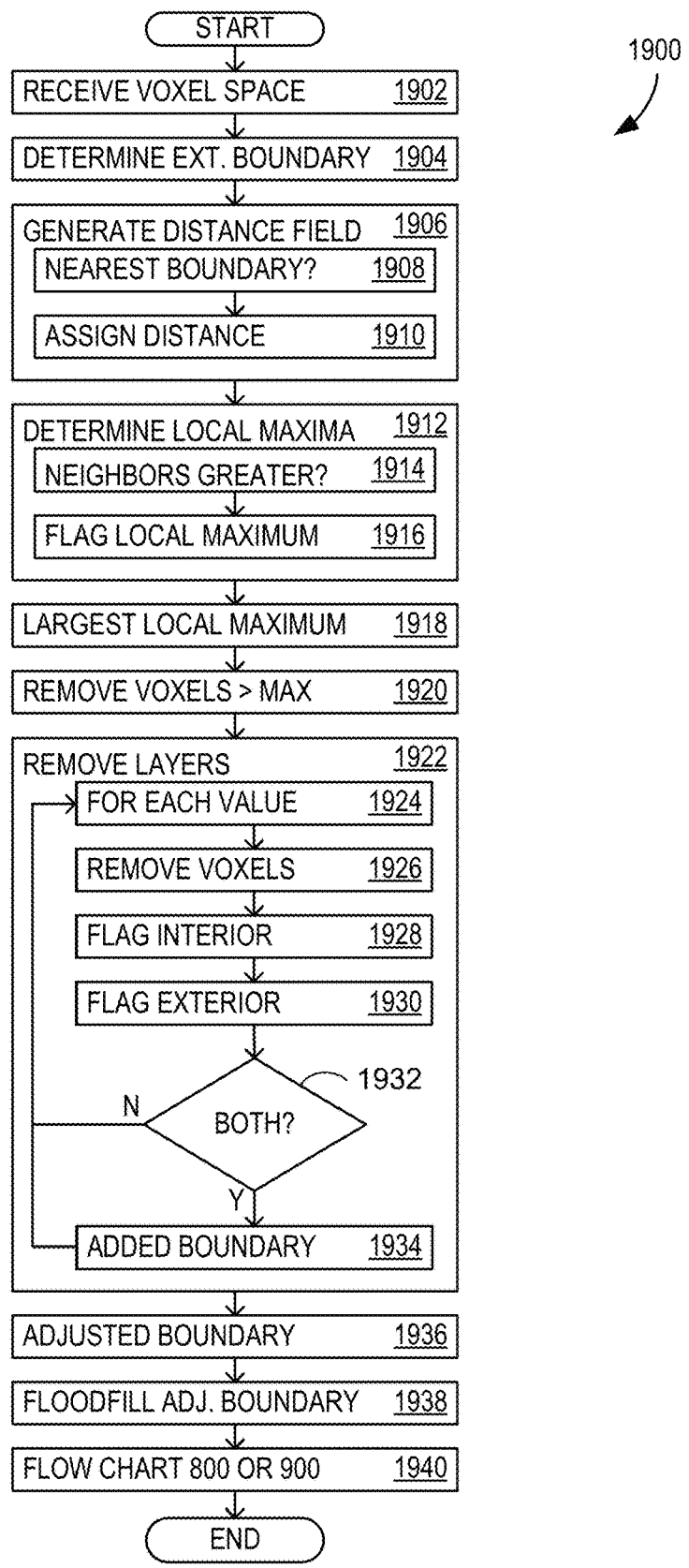
FIG. 19 is another flow chart illustrating exemplary operations involved in complexity reduction via cavity removal.

FIG. 19 is another flow chart illustrating exemplary operations involved in complexity reduction via cavity removal. The operations illustrated in FIG. 19 may be performed by any processing unit, such as a computing node. A voxel space containing an original object having an initial exterior boundary is received in operation 1902, and operation 1904 determines voxels on the initial exterior boundary of the original object. Operation 1906 generates a distance field, outward from the initial exterior boundary of the original object, using operations 1908 and 1910. In some examples, generating a distance field comprises generating a distance field for all voxels in the voxel space and not in the original object (the empty voxels) all the way out to the outer edge of the voxel space. Operation 1908 rasters through at least a portion of the voxel space and, for each voxel exterior to the original object, determines a distance to a nearest initial exterior boundary voxel of the original object. Operation 1910 assigns the determined distance to the voxel as a distance field value.

Operation 1912 determines voxels having a local maximum of the distance field, and includes operations 1914 and 1916. Operation 1914 rasters through at least a portion of the voxel space and, for each voxel in the distance field and not on an outer edge of the voxel space, determines whether any neighboring voxel has a greater a distance field value. In operation 1916, based at least on no neighboring voxel having a greater a distance field value, a voxel is flagged as a local maximum. Operation 1918 then determines the largest local maximum value from among the local maxima, and operation 1920 removes, from the distance field, voxels having a distance field value greater than the largest local maximum value. These removed voxels are outside the object, and out toward the outer edge of the voxel space.

An iterative operation 1922 draws down the distance field one layer at a time, and comprises operations 1924-1934. A layer is all voxels having the same distance field value. Operation 1924 sets up an iteration of a current distance field value, iterating downward from the largest local maximum value. Operation 1926 removes, from the distance field, voxels having a distance field value equal to the current distance field value. Operation 1928 flags, as being in an interior region, voxels removed from the distance field that are contiguous, through one or more other voxels removed from the distance field, with a voxel having a local maximum. The result is an interior region growing around a local maximum. If there are multiple local maxima, the interior region surrounding the largest local maximum grows first, and the interior regions surrounding the other local maxima start growing when the distance field has shrunk to include only lower values comparable to the other local maxima.

Operation 1930 flags, as being in an exterior region, voxels removed from the distance field that are contiguous, through other voxels removed from the distance field, with a voxel on an outer edge of the voxel space. In some situations, removing a layer of the distance field removes multiple voxels in a line between an interior region and an exterior region. Rather than flagging the entire set of newly-removed voxels, only the center voxel is flagged as being both in an interior region and in an exterior region. Decision operation 1932 determines whether a voxel is flagged as both in an interior region and in an exterior region. If so, then operation 1934 includes, based at least on a voxel being flagged as both in an interior region and in an exterior region, flagging the voxel as an added boundary voxel. In some examples of operation 1934, flagging the voxel as an added boundary voxel comprises flagging a center voxel of a set of voxels removed in a same layer. Operation 1936 determines an adjusted exterior boundary as the initial exterior boundary of the original object and any added boundary voxels, and operation 1938 generates a first reduced-complexity object by floodfilling voxels up through the adjusted exterior boundary.

Operation 1940 moves to flow chart 800 or flow chart 900 (see FIGS. 8 and 9) to generate a second reduced-complexity object. In some examples, operation 1940 may include selecting a first maximum distance field value; dilating the first reduced-complexity object by the maximum distance field value to generate a dilated object; and eroding the dilated object by the maximum distance field value to generate an eroded dilated object. In some examples, operation 1940 may include selecting a first ratio threshold; determining one or more added voxels as voxels in the eroded dilated object and not in the original object; determining one or more added regions as sets of contiguous regions of added voxels; and removing, from the eroded dilated object, webbing having a ratio of internal surface voxels to external surface voxels below the first ratio threshold, to generate a second reduced-complexity object.

Figure 20:
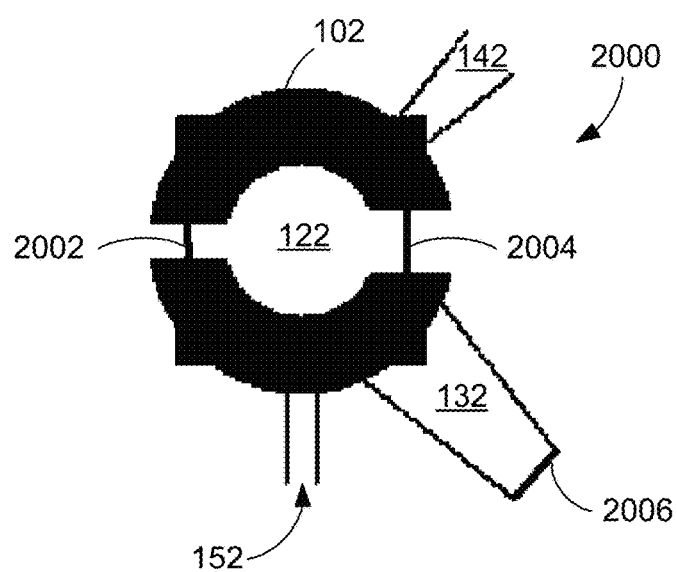
FIG. 20 illustrates an intermediate stage of complexity reduction via cavity removal for the object of FIG. 1.

FIG. 20 illustrates how complexity reduction via hole filling and complexity reduction via cavity removal may produce different results, showing an intermediate stage 2000. Original object 102, used in the example for complexity reduction via hole filling process, explained with FIGS. 1-9, has been subjected to the complexity reduction via cavity removal processes, explained with FIGS. 10-19. As illustrated in FIG. 20, cavity 122 has been capped off with added boundaries 2002 and 2004, and cavity 132 has been sealed with added boundary 2006. This is because the openings of cavities 122 and 132 are narrower than each cavity's internal dimensions.

Figure 21:
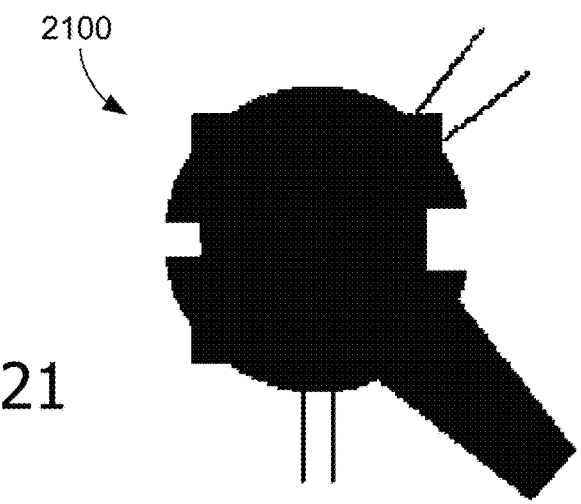
FIG. 21 illustrates a 2D cut plane of a reduced-complexity version of the object of FIG. 1, generated in accordance with various aspects of the disclosure.

In contrast, hole 142 opens such that the mouth is the widest dimension, and hole 152 has parallel sides. Thus, holes 142 and 152 are not sealed off by complexity reduction via cavity removal. A floodfilling operation generates reduced-complexity object 2100, as shown in FIG. 21.

Additional Examples

Some examples are directed to a system for complexity reduction via hole filling that comprises: a processor; and a computer-readable medium storing instructions that are operative when executed by the processor to: receive a voxel space containing an original object having an exterior boundary; determine voxels on the exterior boundary of the original object; select a first maximum distance field value; dilate the original object by the maximum distance field value to generate a dilated object; and erode the dilated object by the maximum distance field value to generate an eroded dilated object.

Some examples are directed to a method of complexity reduction via hole filling that comprises: receiving a voxel space containing an original object having an exterior boundary; determining voxels on the exterior boundary of the original object; selecting a first maximum distance field value; dilating the original object by the maximum distance field value to generate a dilated object; and eroding the dilated object by the maximum distance field value to generate an eroded dilated object.

Some examples are directed to one or more computer storage devices having computer-executable instructions stored thereon for complexity reduction via hole filling, which, on execution by a computer, cause the computer to perform operations comprising: receiving a voxel space containing an original object having an exterior boundary; determining voxels on the exterior boundary of the original object; selecting a first maximum distance field value; dilating the original object by the maximum distance field value to generate a dilated object, wherein dilating the original object comprises: generating a first distance field, outward from the exterior boundary of the original object, up through the maximum distance field value, wherein generating a first distance field comprises: for each voxel exterior to the original object, determining a distance to a nearest exterior boundary voxel of the original object; and based at least on the determined distance being less than or equal to the maximum distance field value, assigning the determined distance to the voxel as a first distance field value; determining a floodfill boundary as a set of outermost voxels of the first distance field having a distance value equal to the maximum distance field value; and floodfilling a floodfill region comprising voxels interior to the floodfill boundary, wherein the dilated object comprises voxels in the floodfill region; eroding the dilated object by the maximum distance field value to generate an eroded dilated object; wherein eroding the dilated object comprises: generating a second distance field, inward from the floodfill boundary, up through the maximum distance field value, wherein generating a second distance field comprises: for each voxel interior to the floodfill region, determining a distance to a nearest floodfill boundary voxel; and based at least on the distance being less than or equal to the maximum distance field value, assigning the determined distance to the voxel as a second distance field value; and removing, from the floodfill region, voxels in the second distance field, wherein the eroded dilated object comprises voxels remaining in the floodfill region; selecting a first ratio threshold; determining one or more added voxels as voxels in the eroded dilated object and not in the original object; determining one or more added regions as sets of contiguous regions of added voxels; and removing, from the eroded dilated object, webbing having a ratio of internal surface voxels to external surface voxels below the first ratio threshold, wherein removing webbing comprises: for each added region: determining surface voxels of the added region; for each surface voxel of the added region: determining whether the surface voxel of the added region is adjacent to a voxel not in the original object; based at least on the surface voxel of the added region being adjacent to a voxel not in the original object, flagging the voxel as an external surface voxel; and based at least on the surface voxel of the added region not being adjacent to a voxel not in the original object, flagging the voxel as an internal surface voxel; determining, for the added region, a ratio of a number of internal surface voxels to a number of external surface voxels; and based at least on the ratio for the added region being below the first ratio threshold, removing the added region from the eroded dilated object.

Alternatively or in addition to the other examples described herein, some examples include any combination of the following: dilating the original object comprises: generating a first distance field, outward from the exterior boundary of the original object, up through the maximum distance field value; determining a floodfill boundary as a set of outermost voxels of the first distance field having a distance value equal to the maximum distance field value; and floodfilling a floodfill region comprising voxels interior to the floodfill boundary, wherein the dilated object comprises voxels in the floodfill region; generating a first distance field comprises: for each voxel exterior to the original object, determining a distance to a nearest exterior boundary voxel of the original object; and based at least on the determined distance being less than or equal to the maximum distance field value, assigning the determined distance to the voxel as a first distance field value; eroding the dilated object comprises: generating a second distance field, inward from the floodfill boundary, up through the maximum distance field value; and removing, from the floodfill region, voxels in the second distance field, wherein the eroded dilated object comprises voxels remaining in the floodfill region; generating a second distance field comprises: for each voxel interior to the floodfill region, determining a distance to a nearest floodfill boundary voxel; and based at least on the distance being less than or equal to the maximum distance field value, assigning the determined distance to the voxel as a second distance field value; selecting a first ratio threshold; and determining one or more added voxels as voxels in the eroded dilated object and not in the original object; determining one or more added regions as sets of contiguous regions of added voxels; and removing, from the eroded dilated object, webbing having a ratio of internal surface voxels to external surface voxels below the first ratio threshold.

Alternatively or in addition to the other examples described herein, some examples may further include any combination of the following: removing webbing comprises: for each added region: determining surface voxels of the added region; for each surface voxel of the added region: determining whether the surface voxel of the added region is adjacent to a voxel not in the original object; based at least on the surface voxel of the added region being adjacent to a voxel not in the original object, flagging the voxel as an external surface voxel; and based at least on the surface voxel of the added region not being adjacent to a voxel not in the original object, flagging the voxel as an internal surface voxel; determining, for the added region, a ratio of a number of internal surface voxels to a number of external surface voxels; and based at least on the ratio for the added region being below the first ratio threshold, removing the added region from the eroded dilated object; repeating, with at least one additional ratio threshold, the removing webbing to generate a plurality of eroded dilated objects; iterating, with at least one additional maximum distance field value, dilating the original object and eroding the dilated object to generate a plurality of eroded dilated objects; and selecting, from the plurality of eroded dilated objects, a reduced-complexity object.

Some examples are directed to a system for complexity reduction via cavity removal that comprises: a processor; and a computer-readable medium storing instructions that are operative when executed by the processor to: receive a voxel space containing an original object having an initial exterior boundary; determine voxels on the initial exterior boundary of the original object; generate a distance field, outward from the initial exterior boundary of the original object; determine voxels having a local maximum of the distance field; determine a largest local maximum value from among the local maxima; remove, from the distance field, voxels having a distance field value greater than the largest local maximum value; for a current distance field value iterating downward from the largest local maximum value; remove, from the distance field, voxels having a distance field value equal to the current distance field value; flag, as being in an interior region, voxels removed from the distance field that are contiguous, through other voxels removed from the distance field, with a voxel having a local maximum; flag, as being in an exterior region, voxels removed from the distance field that are contiguous, through other voxels removed from the distance field, with a voxel on an outer edge of the voxel space; determine whether a voxel is flagged as both in an interior region and in an exterior region; based at least on a voxel being flagged as both in an interior region and in an exterior region, flag the voxel as an added boundary voxel; determine an adjusted exterior boundary as the initial exterior boundary of the original object and any added boundary voxels; and generate a first reduced-complexity object by floodfilling voxels up through the adjusted exterior boundary.

Some examples are directed to a method of complexity reduction via cavity removal that comprises: receiving a voxel space containing an original object having an initial exterior boundary; determining voxels on the initial exterior boundary of the original object; generating a distance field, outward from the initial exterior boundary of the original object; determining voxels having a local maximum of the distance field; determining a largest local maximum value from among the local maxima; removing, from the distance field, voxels having a distance field value greater than the largest local maximum value; for a current distance field value iterating downward from the largest local maximum value; removing, from the distance field, voxels having a distance field value equal to the current distance field value; flagging, as being in an interior region, voxels removed from the distance field that are contiguous, through other voxels removed from the distance field, with a voxel having a local maximum; flagging, as being in an exterior region, voxels removed from the distance field that are contiguous, through other voxels removed from the distance field, with a voxel on an outer edge of the voxel space; determining whether a voxel is flagged as both in an interior region and in an exterior region; based at least on a voxel being flagged as both in an interior region and in an exterior region, flagging the voxel as an added boundary voxel; determining an adjusted exterior boundary as the initial exterior boundary of the original object and any added boundary voxels; and generating a first reduced-complexity object by floodfilling voxels up through the adjusted exterior boundary.

Some examples are directed to one or more computer storage devices having computer-executable instructions stored thereon for complexity reduction via cavity removal, which, on execution by a computer, cause the computer to perform operations comprising: receiving a voxel space containing an original object having an initial exterior boundary; determining voxels on the initial exterior boundary of the original object; generating a distance field, outward from the initial exterior boundary of the original object; determining voxels having a local maximum of the distance field; determining a largest local maximum value from among the local maxima; removing, from the distance field, voxels having a distance field value greater than the largest local maximum value; for a current distance field value iterating downward from the largest local maximum value; removing, from the distance field, voxels having a distance field value equal to the current distance field value; flagging, as being in an interior region, voxels removed from the distance field that are contiguous, through other voxels removed from the distance field, with a voxel having a local maximum; flagging, as being in an exterior region, voxels removed from the distance field that are contiguous, through other voxels removed from the distance field, with a voxel on an outer edge of the voxel space; determining whether a voxel is flagged as both in an interior region and in an exterior region; based at least on a voxel being flagged as both in an interior region and in an exterior region, flagging the voxel as an added boundary voxel; determining an adjusted exterior boundary as the initial exterior boundary of the original object and any added boundary voxels; and generating a first reduced-complexity object by floodfilling voxels up through the adjusted exterior boundary.

Alternatively or in addition to the other examples described herein, some examples include any combination of the following: generating a distance field for all voxels in the voxel space and not in the original object; generating a distance field comprises: for each voxel exterior to the original object, determining a distance to a nearest initial exterior boundary voxel of the original object; and assigning the determined distance to the voxel as a distance field value; determining a local maximum comprises: for each voxel in the distance field and not on an outer edge of the voxel space, determining whether any neighboring voxel has a greater a distance field value; and based at least on no neighboring voxel having a greater a distance field value, flagging the voxel as a local maximum; flagging the voxel as an added boundary voxel comprises flagging a center voxel of a set of voxels removed in a same layer; selecting a first maximum distance field value; dilating the first reduced-complexity object by the maximum distance field value to generate a dilated object; and eroding the dilated object by the maximum distance field value to generate an eroded dilated object; selecting a first ratio threshold; determining one or more added voxels as voxels in the eroded dilated object and not in the original object; determining one or more added regions as sets of contiguous regions of added voxels; and removing, from the eroded dilated object, webbing having a ratio of internal surface voxels to external surface voxels below the first ratio threshold, to generate a second reduced-complexity object.

While the aspects of the disclosure have been described in terms of various examples with their associated operations, a person skilled in the art would appreciate that a combination of operations from any number of different examples is also within scope of the aspects of the disclosure.

Example Operating Environment

Figure 22:
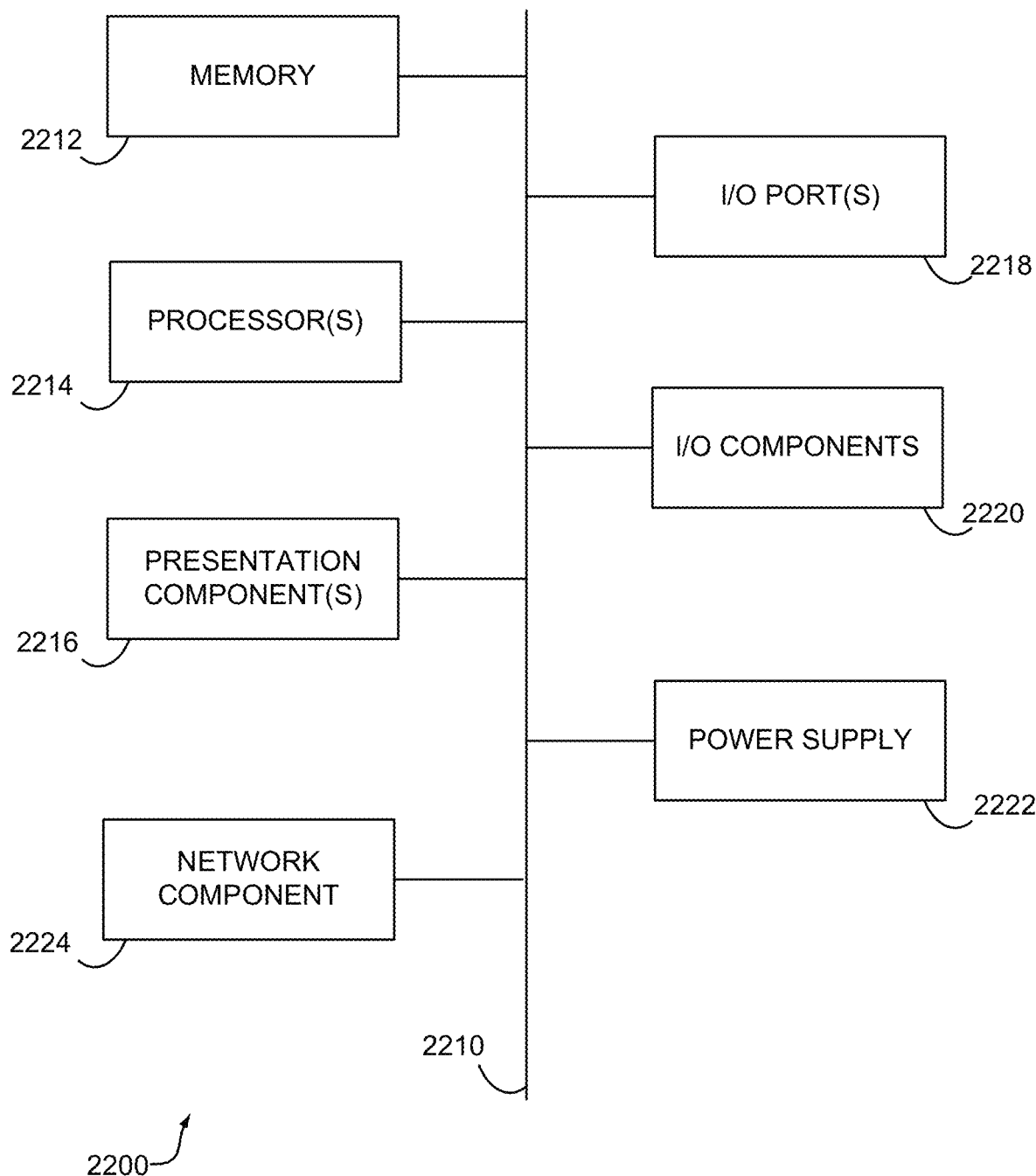
FIG. 22 is an exemplary block diagram illustrating an operating environment for a computing device suitable for implementing various aspects of the disclosure.

FIG. 22 is a block diagram of an example computing device 2200 or node for implementing aspects disclosed herein, and is designated generally as computing device 2200. Computing device 2200 is one example of a suitable computing environment and is not intended to suggest any limitation as to the scope of use or functionality of the invention. Neither should the computing device 2200 be interpreted as having any dependency or requirement relating to any one or combination of components/modules illustrated.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments, where tasks are performed by remote-processing devices that are linked through a communications network. For example, a distributed computing environment may host cloud synthetics services. Some embodiments of synthetics services may provide synthetic 3D environments as well as rendering a surface in a synthetic scene.

Computing device 2200 includes a bus 2210 that directly or indirectly couples the following devices: memory 2212, one or more processors 2214, one or more presentation components 2216, input/output (I/O) ports 2218, I/O components 2220, a power supply 2222, and a network component 2224. Computing device 2200 should not be interpreted as having any dependency or requirement related to any single component or combination of components illustrated therein. While computing device 2200 is depicted as a seemingly single device, multiple computing devices 2200 may work together and share the depicted device resources. For example, memory 2212 may be distributed across multiple devices, processor(s) 2214 may provide housed on different devices, and so on.

Bus 2210 represents what may be one or more busses (such as an address bus, data bus, or a combination thereof). Although the various blocks of FIG. 22 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and the diagram of FIG. 22 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 22 and the references herein to a "computing device."

Memory 2212 may include any of the computer-readable media discussed herein. Memory 2212 may be used to store and access instructions configured to carry out the various operations disclosed herein. In some examples, memory 2212 includes computer storage media in the form of volatile and/or nonvolatile memory, removable or non-removable memory, data disks in virtual environments, or a combination thereof.

Processor(s) 2214 may include any quantity of processing units that read data from various entities, such as memory 2212 or I/O components 2220. Specifically, processor(s) 2214 are programmed to execute computer-executable instructions for implementing aspects of the disclosure. The instructions may be performed by the processor, by multiple processors within the computing device 2200, or by a processor external to the client computing device 2200. In some examples, the processor(s) 2214 are programmed to execute instructions such as those illustrated in the flowcharts discussed below and depicted in the accompanying drawings. Moreover, in some examples, the processor(s) 2214 represent an implementation of analog techniques to perform the operations described herein. For example, the operations may be performed by an analog client computing device 2200 and/or a digital client computing device 2200.

Presentation component(s) 2216 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 2200, across a wired connection, or in other ways.

Ports 2218 allow computing device 2200 to be logically coupled to other devices including I/O components 2220, some of which may be built in. Example I/O components 2220 include, for example but without limitation, a microphone, keyboard, mouse, joystick, game pad, satellite dish, scanner, printer, wireless device, etc.

In some examples, the network component 2224 includes a network interface card and/or computer-executable instructions (e.g., a driver) for operating the network interface card. Communication between the computing device 2200 and other devices may occur using any protocol or mechanism over any wired or wireless connection. In some examples, the network component 2224 is operable to communicate data over public, private, or hybrid (public and private) using a transfer protocol, between devices wirelessly using short range communication technologies (e.g., near-field communication (NFC), BLUETOOTH® branded communications, or the like), or a combination thereof.

Although described in connection with an example computing device 2200, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Some examples herein are described as performing certain operations via "iteration," "iterative computing," and other variations of such language. Iteration refers to repeatedly performing the same operation or set of operations upon each object in a set of objects until the operation or set of operations has been performed upon every object in the set of objects. It should be understood that, unless explicitly stated otherwise, iteration over a set of objects can be done either sequentially (e.g.: operate on A; then B; then C; then D) or concurrently (e.g.: operate on A and B simultaneously; then operate on C and D simultaneously). Concurrent iteration can process as many objects at once as an example operating environment practicably allows.

Sequential iteration is most suitable to examples where only a single processor is available to perform operations and/or the computing environment does not support multi-threaded computation. Concurrent iteration is most suitable to examples where more than one processor is available to perform operations and/or the computing environment does support multi-threaded (also referred to as parallel) computation. Concurrent iteration exhibits considerable performance advantages over sequential iteration, especially when working with large data sets.

Examples are given herein, in both this Detailed Description and the Drawings, utilizing sequential iteration so that the Detailed Description and Drawings facilitate both full understanding of the disclosure and the greatest possible clarity. No portion of this disclosure expresses, nor is any portion of this disclosure intended to express, that only sequential iteration or concurrent iteration is usable for any particular instance of iteration herein. The use of sequential iteration in the Drawings does not express a preference for sequential iteration over concurrent iteration. No such preference exists—examples of the disclosure should implement whatever type of iteration is most suited to the example's intended application.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for complexity reduction of objects via hole filling, the system comprising:
   a processor; and
   a computer-readable medium storing instructions that are operative when executed by the processor to:
   receive a voxel space containing a first object having an exterior boundary;
   determine voxels on the exterior boundary of the first object;
   select a maximum distance field value;
   dilate the first object by the maximum distance field value to generate a dilated object; and
   erode the dilated object to generate an eroded dilated object having reduced complexity for processing, wherein eroding the dilated object includes comparing the maximum distance field value with a distance of a voxel interior to a floodfill region of the dilated object from a nearest floodfill boundary voxel.

2. The system of claim 1 wherein dilating the first object comprises:
   generating a first distance field, outward from the exterior boundary of the first object, up through the maximum distance field value;
   determining a floodfill boundary as a set of outermost voxels of the first distance field having a distance value equal to the maximum distance field value; and
   floodfilling the floodfill region comprising voxels interior to the floodfill boundary, wherein the dilated object comprises voxels in the floodfill region.

3. The system of claim 1 wherein generating a first distance field comprises:
   for each voxel exterior to the first object, determining a distance to a nearest exterior boundary voxel of the first object; and
   based at least on the determined distance being less than or equal to the maximum distance field value, assigning the determined distance to the voxel as a first distance field value.

4. The system of claim 1 wherein eroding the dilated object comprises:
   generating a second distance field, inward from a floodfill boundary, up through the maximum distance field value; and
   removing, from the floodfill region, voxels in the second distance field, wherein the eroded dilated object comprises voxels remaining in the floodfill region.

5. The system of claim 4 wherein generating a second distance field comprises:
   for each voxel interior to the floodfill region, determining a distance to the nearest floodfill boundary voxel; and
   based at least on the distance being less than or equal to the maximum distance field value, assigning the determined distance to the voxel as a second distance field value.

6. The system of claim 1 wherein the instructions are further operative to:
   select a first ratio threshold;
   determine one or more added voxels as voxels in the eroded dilated object and not in the first object;
   determine one or more added regions as sets of contiguous regions of added voxels; and
   remove, from the eroded dilated object, webbing having a ratio of internal surface voxels to external surface voxels below the first ratio threshold.

7. The system of claim 6 wherein removing webbing comprises:
   for each added region:
      determining surface voxels of the added region;
      for each surface voxel of the added region:
         determining whether the surface voxel of the added region is adjacent to a voxel not in the first object;
         based at least on the surface voxel of the added region being adjacent to a voxel not in the first object, flagging the voxel as an external surface voxel; and
         based at least on the surface voxel of the added region not being adjacent to a voxel not in the first object, flagging the voxel as an internal surface voxel;
      determining, for the added region, a ratio of a number of internal surface voxels to a number of external surface voxels; and
      based at least on the ratio for the added region being below the first ratio threshold, removing the added region from the eroded dilated object.

8. The system of claim 6 wherein the instructions are further operative to:
   iterate, with at least one additional ratio threshold, the removing of webbing to generate a plurality of eroded dilated objects.

9. The system of claim 1 wherein the instructions are further operative to:
   iterate, with at least one additional maximum distance field value, the dilating of the first object and the eroding of the dilated object to generate a plurality of eroded dilated objects.

10. A method of complexity reduction of objects via hole filling, the method comprising:
    receiving a voxel space containing a first object having an exterior boundary;
    determining voxels on the exterior boundary of the first object;
    selecting a maximum distance field value;
    dilating the first object by the maximum distance field value to generate a dilated object; and
    eroding the dilated object to generate an eroded dilated object having reduced complexity for processing, wherein eroding the dilated object comprises comparing the maximum distance field value with a distance of a voxel interior to a floodfill region of the dilated object from a nearest floodfill boundary voxel.

11. The method of claim 10 wherein dilating the first object comprises:
    generating a first distance field, outward from the exterior boundary of the first object, up through the maximum distance field value;
    determining a floodfill boundary as a set of outermost voxels of the first distance field having a distance value equal to the maximum distance field value; and
    floodfilling the floodfill region comprising voxels interior to the floodfill boundary, wherein the dilated object comprises voxels in the floodfill region.

12. The method of claim 11 wherein generating a first distance field comprises:
    for each voxel exterior to the first object, determining a distance to a nearest exterior boundary voxel of the first object; and
    based at least on the determined distance being less than or equal to the maximum distance field value, assigning the determined distance to the voxel as a first distance field value.

13. The method of claim 10 wherein eroding the dilated object comprises:

generating a second distance field, inward from a floodfill boundary, up through the maximum distance field value; and removing, from the floodfill region, voxels in the second distance field, wherein the eroded dilated object comprises voxels remaining in the floodfill region.

14. The method of claim 13 wherein generating a second distance field comprises:
for each voxel interior to the floodfill region, determining a distance to the nearest floodfill boundary voxel; and
based at least on the distance being less than or equal to the maximum distance field value, assigning the determined distance to the voxel as a second distance field value.

15. The method of claim 10 further comprising:
selecting a first ratio threshold;
determining one or more added voxels as voxels in the eroded dilated object and not in the first object;
determining one or more added regions as sets of contiguous regions of added voxels; and
removing, from the eroded dilated object, webbing having a ratio of internal surface voxels to external surface voxels below the first ratio threshold.

16. The method of claim 15 wherein removing webbing comprises:
for each added region:
determining surface voxels of the added region;
for each surface voxel of the added region:
determining whether the surface voxel of the added region is adjacent to a voxel not in the first object;
based at least on the surface voxel of the added region being adjacent to a voxel not in the first object, flagging the voxel as an external surface voxel; and
based at least on the surface voxel of the added region not being adjacent to a voxel not in the first object, flagging the voxel as an internal surface voxel;
determining, for the added region, a ratio of a number of internal surface voxels to a number of external surface voxels; and
based at least on the ratio for the added region being below the first ratio threshold, removing the added region from the eroded dilated object.

17. The method of claim 15 further comprising:
iterating, with at least one additional ratio threshold, the removing webbing to generate a plurality of eroded dilated objects.

18. The method of claim 10 further comprising:
iterating, with at least one additional maximum distance field value, dilating the first object and eroding the dilated object to generate a plurality of eroded dilated objects.

19. One or more computer storage devices having computer-executable instructions stored thereon for complexity reduction of objects via hole filling, which, on execution by a computer, cause the computer to perform operations comprising:
receiving a voxel space containing a first object having an exterior boundary;
determining voxels on the exterior boundary of the first object;
selecting a maximum distance field value;
dilating the first object by the maximum distance field value to generate a dilated object; and
eroding the dilated object to generate an eroded dilated object having reduced complexity for processing, wherein eroding the dilated object includes comparing the maximum distance field value with a distance of a voxel interior to a floodfill region of the dilated object from a nearest floodfill boundary voxel.

20. The one or more computer storage devices of claim 19 wherein the operations further comprise:
iterating, with at least one additional ratio threshold or with at least one additional maximum distance field value, to generate a plurality of eroded dilated objects; and
selecting, from the plurality of eroded dilated objects, a reduced-complexity object.

* * * * *